United States Patent [19]

Biery, Jr. et al.

[11] 4,197,525
[45] Apr. 8, 1980

[54] TONE DECODER

[75] Inventors: Galen A. Biery, Jr., Bellingham; Dan E. Rothenbuhler, Acme, both of Wash.

[73] Assignee: Rothenbuhler Engineering Co., Sedro Woolley, Wash.

[21] Appl. No.: 959,358

[22] Filed: Nov. 9, 1978

[51] Int. Cl.[2] ............................................ G01K 23/02
[52] U.S. Cl. .......................... 340/171 PF; 324/78 D; 324/82; 328/134
[58] Field of Search ......... 340/171 PF, 171 R, 168 B; 324/78 D, 79, 82; 328/133, 134, 155

[56] References Cited

U.S. PATENT DOCUMENTS

| Re. 27,044 | 2/1971 | Rothenbuhler, et al. | 340/171 X |
|---|---|---|---|
| 3,395,346 | 7/1968 | Kincheloe et al. | 324/82 X |
| 3,806,664 | 4/1974 | Bowen et al. | 340/171 X |
| 3,984,770 | 10/1976 | Chu | 324/82 |
| 4,021,653 | 5/1977 | Sharp et al. | 324/78 D X |

Primary Examiner—Donald J. Yusko
Attorney, Agent, or Firm—Christensen, O'Connor, Johnson & Kindness

[57] ABSTRACT

An improved decoder for providing a decoder output signal when a tone signal contains frequencies that are sequentially within a predetermined passband surrounding first and second detection frequencies $f_1$, $f_2$. A tone signal is mixed with a reference signal which alternates, at a multiplex frequency, between sine and cosine signals, each being at a predetermined reference frequency which is less than the multiplex frequency. A tone switching logic circuit normally maintains the reference frequency at a value substantially equal to the frequency $f_1$. The mixed signal is coupled through a demultiplexer to respective inputs of first, second, third and fourth low pass filters, each of which has a cut-off frequency which is one-half of the decoder passband. The respective outputs of the filters are coupled through a multiplexer to a squarer. Normally, the demultiplexer and the multiplexer are controlled by the tone switching logic ciruit so as to alternately couple, at the multiplex frequency, the mixed signal to the inputs of the first and second filters, and the outputs thereof to the squarer. The squarer output is applied to a summing amplifier, which removes the multiplex frequency, and which provides a dc signal which is applied to a comparator. When the value of the dc signal exceeds a threshold value, the comparator provides a first output signal which causes the tone switching logic circuit to change the reference frequency to the frequency $f_2$, and to control the demultiplexer and multiplexer so that the mixed signal is thereafter alternately coupled, at the multiplex frequency, to the inputs of the third and fourth low pass filters, and so that the outputs thereof are alternately coupled, at the multiplex frequency, to the squarer. A decoder output signal is provided, however, only if a second output signal from the comparator is provided within a predetermined period of time following the provision of the first output signal therefrom. The reference signal is preferably provided by a sine/cosine generator from pulses provided by a divide-by-N counter occurring at the multiplex frequency, with the divisor N being controlled by the tone switching logic circuit.

20 Claims, 17 Drawing Figures

ded signal is received and demodulated. The tones
TONE DECODER

FIELD OF THE INVENTION

This invention generally relates to the field of communication systems, and, more particularly, to apparatus for decoding signals which are encoded by means of one or more tones of specified frequency.

BACKGROUND OF THE INVENTION

Communication systems are known which function to provide reliable, remote operation of a utilization device. In such systems, a suitably encoded signal is produced, usually by modulating one or more tones of specified frequency and duration, on an appropriate RF carrier. At the location of the utilization device, the encoded signal is received and demodulated. The tones are then applied to a decoding apparatus which provides an output signal to actuate the utilization device if, and only if, the tones have the specified frequency and duration.

One such system that has found widespread commercial acceptance in the logging industry, in which it is desirable to effect the remote actuation of a whistle or other signalling device, employs an encoded signal commonly identified as "two-tone sequential." In this system, as more completely described in U.S. Pat. No. Re. 27,044, "Two-Tone Remote Control System," Rothenbuhler et al., issued Feb. 2, 1971 to the assignee of the present invention, a first tone of limited duration and of a specified frequency, typically in the audible frequency range, is modulated upon an RF carrier. Immediately following the termination of the first tone, a second tone of a specified frequency different from the frequency of the first tone, but typically in the audible frequency range, and of a duration equal to the desired actuation time of the whistle, is modulated on the RF carrier. At the location of the whistle, any signals having the frequency of the RF carrier are received and demodulated. The demodulated signals are supplied to first and second decoders. The first decoder includes a resonant circuit which is tuned to the nominal frequency of the first tone, and is operative to provide an output signal for a predetermined period of time following detection of a demodulated signal having a frequency within the bandwidth of the resonant circuit. The second decoder also includes a resonant circuit which is tuned to the nominal frequency of the second tone, and provides an output signal to the whistle for the duration of any demodulated signal having a frequency within the bandwidth of its resonant circuit, but only if such a demodulated signal is detected within the predetermined time period established by the output signal from the first decoder. Such "two-tone sequential" systems provide reliable, remote actuation of a utilization device, even in the presence of encoded signals utilized in other communication systems which have the same RF carrier modulated with a single tone at the nominal frequency of either the first or the second times.

Because the decoders in the system described in U.S. Pat. No. Re. 27,044 utilize resonant circuits, it is to be noted that each resonant circuit must be carefully tuned to ensure that its respective decoder will be responsive only to a specified tone. Since the system is often used for considerable periods of time under harsh environmental conditions, the parameters of the resonant circuits may change, necessitating retuning. It is also necessary to retune the resonant circuits to provide different combinations of first and second tones in situations in which two or more such systems are to be used in proximity to each other to effect the remote actuation of two or more, independent utilization devices. Such retuning is of course costly and time consuming and therefore undesirable.

It is therefore an object of this invention to provide an improved tone decoder particularly useful in two-tone sequential communication systems.

It is a further object of this invention to provide such a decoder which does not utilize resonant circuits.

It is yet a further object of this invention to provide such a decoder in which recalibration of the tone to which the decoder is responsive is relatively easy to effect, compared with the decoders of the prior art.

It is another object of this invention to provide such a decoder in which the nominal frequency of the tone to which the decoder is responsive is relatively stable over long periods of time.

It is yet another object of this invention to provide such a decoder which has a sharply defined and stable bandwidth surrounding the nominal frequency to which the decoder is responsive.

It is still another object of this invention to provide such a decoder which can be implemented utilizing readily available solid-state components and integrated circuits, and which accordingly is inexpensive to manufacture.

SUMMARY OF THE INVENTION

Briefly, the foregoing objects, and other objects and advantages that will be apparent to those of ordinary skill in the art, are achieved by the use of a method for detecting whether the frequency $f_i$ of a tone signal is within a passband $f_b$ surrounding a desired detection frequency $f_d$. In the method, a mixed signal is provided by mixing the tone signal with a reference signal alternating at a frequency $f_m$ between values related to sin $f_r$ and cos $f_r$, where $f_r$ is a frequency substantially equal to $f_d$ and where $f_m$ is substantially greater than $f_r$. In synchronism with the frequency $f_m$, any components of the mixed signal that are related to sin $f_x$ and cos $f_x$, where $f_x = |f_i - f_r|$, provided that $f_x$ is substantially equal to or less than $f_b/2$, are filtered to provide a filtered signal alternating at the frequency $f_m$ between values related to sin $f_x$ and cos $f_x$. The filtered signal is squared to provide a squared signal alternating at the frequency $f_m$ between values related to $\sin^2 f_x$ and $\cos^2 f_x$. The squared signal is integrated over a period related to the frequency $f_m$ to provide a dc signal. When the value of the dc signal equals or exceeds a predetermined value thereof, an indication of tone detection is provided.

BRIEF DESCRIPTION OF THE DRAWINGS

The invention can best be understood by reference to the following portion of the specification, taken in conjunction with the accompanying drawings, in which:

FIGS. 4(a-f) are timing diagrams illustrating the operation of the sine/cosine generator of FIG. 3;

FIGS. 6(a-g) are timing diagrams illustrating the operation of the tone switching logic circuit of FIG. 5.

DESCRIPTION OF A PREFERRED EMBODIMENT

Figure 1:
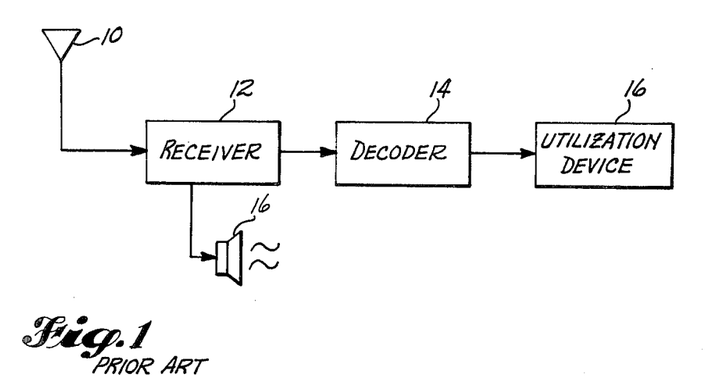
FIG. 1 is a block diagram of the remote portion of a communication system for effecting actuation of a utilization device, as known to the prior art.

Referring now to FIG. 1, an encoded signal, comprising one or more tone signals of predetermined frequency and duration modulated upon an appropriate RF carrier, is picked up by an antenna 10 and applied to a receiver 12. After detection and demodulation in receiver 12, the tone signals are supplied to a decoder 14 and, if in the audible frequency range, to a loudspeaker 16 for audible reproduction thereby. The decoder 14 is operative to provide an output signal to actuate a utilization device 16 if, and only if, the tone signals supplied to decoder 14 have the proper coding. The present invention is particularly concerned with an improved form of decoder 14, and the preferred embodiment to be described hereinafter is particularly adapted to decode a "two-tone sequential" encoded signal of the type commonly used in the logging industry. It is to be clearly understood, however, that the decoder of the present invention is not limited thereto, and is adapted to decode encoded signals in which the coding is represented by a single tone signal of a predetermined frequency, or multiple tone signals, each of a predetermined frequency, and of a predetermined timing relationship to each other, as will be apparent from the ensuing discussion.

In summary, the decoder of the present invention effects decoding upon satisfaction of the trigonometric identity $$a(\sin^2 f_x) + a(\cos^2 f_x) = a$$

where $f_x = |f_i - f_r|$ $f_i$ = the frequency of the tone signal $f_r$ = the frequency of a reference signal which is substantially equal to a desired detection frequency $f_d$ of the decoder, provided that $(f_i - f_r)$ is within a passband $f_b$ whose center frequency is that of the frequency $f_r$.

In the embodiment to be discussed, the tone signal to be detected has sequential detection frequencies $f_d = f_1$ and $f_d = f_2$, each in the audible frequency range, and the decoder 14 provides an output signal only if detection of the frequency $f_2$ is accomplished within a predetermined period following the termination of frequency $f_1$.

Figure 2:
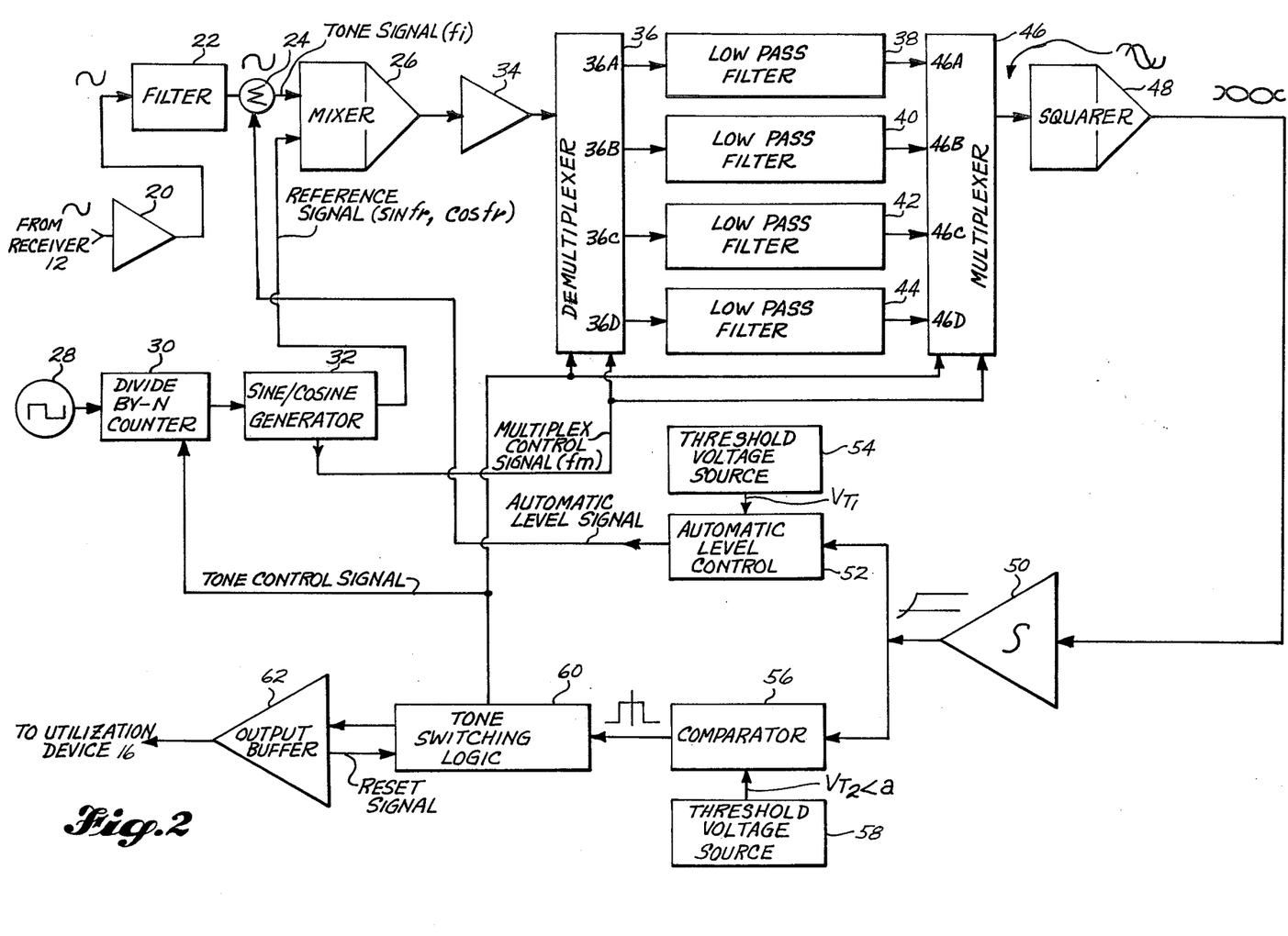
FIG. 2 is a block diagram of a preferred embodiment of a decoder useful in such a communication system and constructed according to the teachings of the present invention.

Referring now to FIG. 2, the tone signal from receiver 12 is amplified by an amplifier 20 and applied to the input of a bandpass filter 22 whose bandpass covers the expected range of all frequencies $f_1$, $f_2$ to be detected by the decoder 14. In the logging industry application previously referred to, this range is approximately 250-6000 Hz. The tone signal appearing on the output of bandpass filter 22, and having a frequency $f_i$, is subtractively combined in a summing junction 24 with a dc, automatic level signal, to be described hereinafter, and applied to a first input of a mixer 26.

An oscillator 28, preferably of the crystal-stabilized type, provides an output signal, having a frequency which is substantially greater than the desired detection frequencies $f_1$, $f_2$, to a programmable, divide-by-N counter 30. The divisor N of counter 30 is controlled by a tone control signal, to be hereinafter described, so that counter 30 produces a series of short, unidirectional output pulses having a predetermined frequency which is equal to a desired multiplex frequency $f_m$. The output pulses from counter 30 are applied to a sine/cosine generator 32 which in turn provides a reference signal which is applied to a second input of mixer 26, and also provides a square wave multiplex control signal having a frequency which is related to the multiplex frequency $f_m$. The reference signal consists of alternating sine and cosine signals, each at a frequency $f_r$, and alternates therebetween at the multiplex frequency $f_m$, where $f_m$ is an integral multiple of $f_r$. In the embodiment under discussion, the divisor N in the counter 30 is controlled by the tone control signal so that the reference signal has a frequency $f_r \approx f_1$ when the tone control signal has a low logic level, and has a frequency $f_r \approx f_2$ when the tone control signal has a high logic level.

Figure 3:
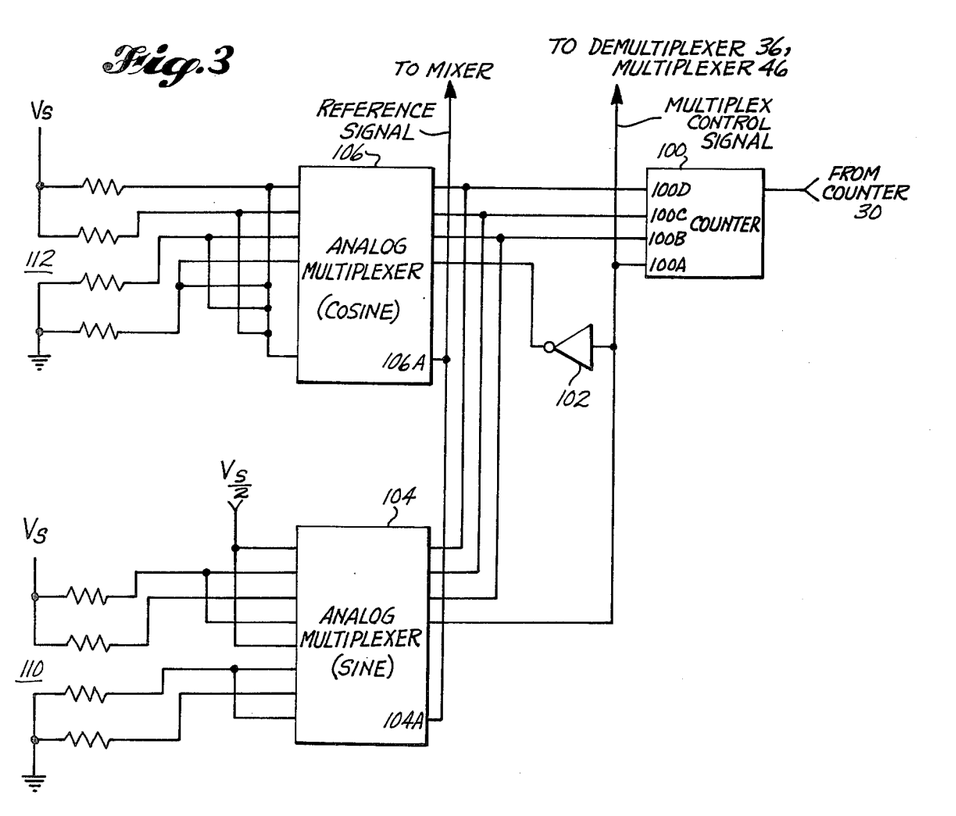
FIG. 3 is a block diagram of a preferred embodiment of a sine/cosine generator forming part of the decoder of FIG. 2.
Figure 4A:
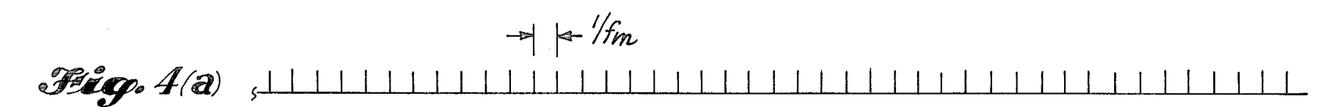
Figure 4B:
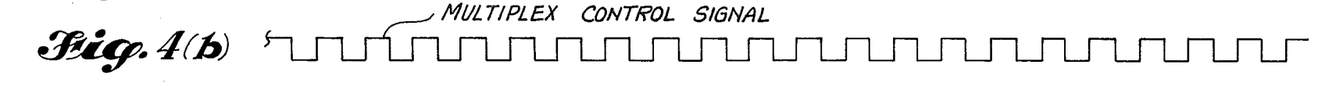
Figure 4C:
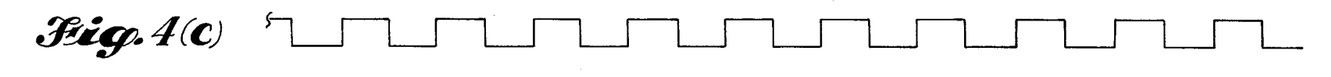
Figure 4D:
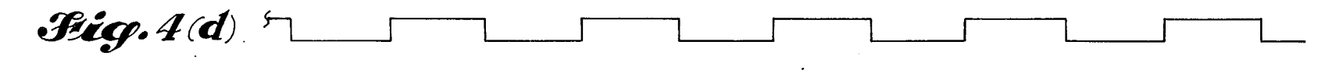
Figures 4E, 4F:
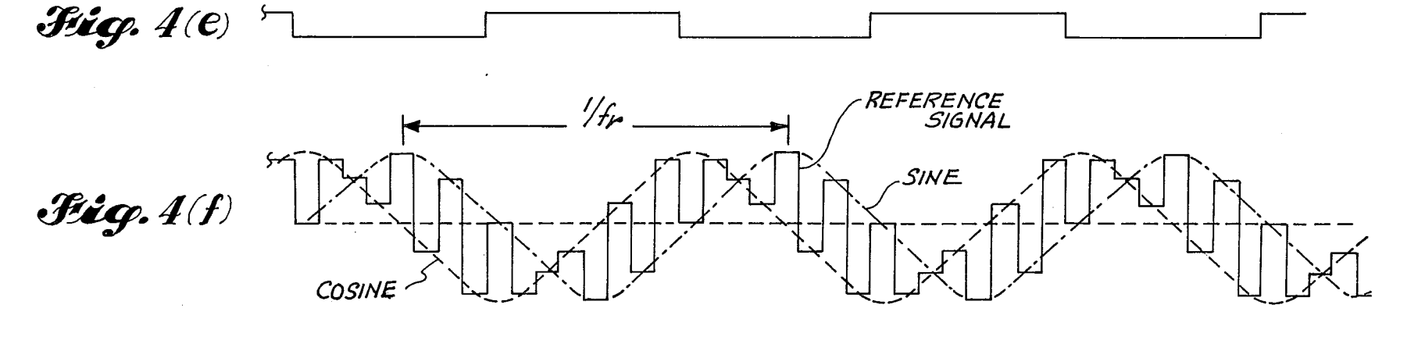

Referring now to FIGS. 3 and 4(a)-4(f), the sine/cosine generator 32 includes a counter 100, an inverter 102, a first analog multiplexer 104, a second analog multiplexer 106, a first resistive network 110, and a second resistive network 112. Counter 100, which may comprise a four-bit binary counter such as the 74C93 integrated circuit chip available from a number of manufacturers, receives the output pulses from divide-by-N counter 30 occurring at the frequency $f_m$ as illustrated in FIG. 4(a). In response, counter 100 provides a square wave signal on output 100A thereof, as illustrated in FIG. 4(b), which alternates between high and low logic levels at the frequency $f_m$, with a high logic level denoting production of a sine wave and a low logic level denoting production of a cosine wave. The square wave signal on output 100A comprises the multiplex control signal, and is also applied directly to an enable input of analog multiplexer 104, and through inverter 102 to an enable input of analog multiplexer 106. As a result, multiplexer 104 is enabled as long as the signal on output 100A has a high logic level, and multiplexer 106 is enabled as long as the signal on output 100A has a low logic level. Therefore, multiplexer 104 is used to generate a sine wave, and multiplexer 106 is used to generate a cosine wave. Counter 100 also provides square wave signals on outputs 100B, 100C, 100D, with the frequency of the signal on output 100B being ½ of that on output 100A, with the signal on output 100C having a frequency which is ½ of that on output 100B, and with the signal on output 100D having a frequency which is ½ of that on output 100C, as illustrated, respectively, in FIGS. 4(c), 4(d) and 4(e). The signal on output 100D is at the reference frequency $f_r$, and in the embodiment discussed is 1/16th of the multiplex frequency $f_m$. Therefore, $f_m = 16f_r$ and each cycle at the reference frequency consists of sixteen multiplex periods.

The signals on outputs 100B, 100C and 100D are applied in common to respective address inputs of analog multiplexers 104, 106, each of which may comprise a type 4051 integrated circuit chip available from a number of manufacturers. The multiplexers 104, 106 have respective outputs 104A, 106A connected in common, and a plurality of respective signal inputs which are connected to respective points in the resistive networks 110, 112. A source of a supply potential $V_s$ and ground potential are also connected to the resistive networks 110, 112, and a potential $V_s/2$ equal to one-half of the supply potential $V_s$ is connected to respective inputs of the multiplexer 104. Each multiplexer 104, 106 includes a plurality of analog gates and a decoder which are responsive to specific combination of signals on outputs 100B, 100C and 100D occurring during a multiplex period for coupling one of the signal inputs thereof to the respective outputs 104A, 106A. The values of the resistors within the resistor networks 110, 112, and the circuit interconnections thereof, as well as the value of the potential $V_s/2$, are chosen so that a discrete voltage level is supplied to each signal input of multiplexers 104, 106. Each discrete voltage level supplied to multiplexer 104 corresponds to an average value of a sine wave during one multiplex period, and each discrete voltage level supplied to multiplexer 106 corresponds to an average value of a cosine wave during one multiplex period. Counter 100 accordingly controls multiplexers 104, 106 to provide, on the common connection of outputs 104A, 106A, the reference signal which alternates, at the frequency $f_m$, between discrete voltage levels corresponding to the average levels of a sine wave and a cosine wave, each at the frequency $f_r$.

Returning now to FIG. 2, the mixer 26, which may comprise an analog multiplexer such as a type MC1594L integrated circuit chip available from Motorola, multiplies the tone signal and the reference signal applied to its respective first and second inputs, and provides an output signal which includes alternating sine and cosine signals at the sum of the frequencies of the tone signal and the reference signal $(f_i+f_r)$ and at the difference of those frequencies $(f_i-f_r)$, with alteration occurring at the multiplex frequency $f_m$. The output signal from mixer 26 is amplified in an amplifier 34, and applied to the input of a demultiplexer 36 to which is also applied the multiplex control signal and the tone control signal. Demultiplexer 36 has a plurality of outputs 36A, 36B, 36C and 36D which are coupled to respective inputs of low pass filters 38, 40, 42 and 44. The outputs of filters 38, 40, 42 and 44 are respectively coupled to inputs 46A, 46B, 46C and 46D of a multiplexer 46 to which is also applied the multiplex control signal and the tone control signal.

Demultiplexer 36 and multiplexer 46, which may comprise separate portions of a type 4052 integrated circuit chip available from a number of manufacturers, are operated in synchronism under control of the multiplex control and tone control signals. When a tone signal at or near the frequency $f_1$ is to be detected, the tone control signal is at a low logic level and $f_r \approx f_1$. When the multiplex control and tone control signals each have a low logic level, the input of demultiplexer 36 is coupled to the output 36A thereof, and the input 46A of multiplexer 46 is coupled to the output thereof, whereby any sine signal, having a frequency substantially equal to or less than the cut-off frequency of low pass filter 38, in the output signal from mixer 26 is passed through low pass filter 38 to the output of multiplexer 46. Similarly, when the multiplex control signal has a high logic level and the tone control signal has a low logic level, the input of demultiplexer 36 is coupled to the output 36B thereof, and the input 46B of multiplexer 46 is coupled to the output thereof, whereby any cosine signal, having a frequency substantially equal to or less than the cut-off frequency of low pass filter 40, in the output signal from mixer 26 is passed through low pass filter 40 to the output of multiplexer 46. When a tone signal at or near the frequency $f_2$ is to be detected, the tone control signal is at a high logic level and $f_r \approx f_2$. When the multiplex control signal has a low logic level and the tone control signal has a high logic level, the input of demultiplexer 36 is coupled to the output 36C thereof, and the input 46C of multiplexer 46 is coupled to the output thereof, whereby any sine signal, having a frequency substantially equal to or less than the cut-off frequency of low pass filter 42, in the output signal from mixer 26 is passed through low pass filter 42 to the output of multiplexer 46. When both the multiplex control and tone signals have a high logic level, the input of demultiplexer 36 is coupled to the output 36D thereof, and the input 46D of multiplexer 46 is coupled to the output thereof, whereby any cosine signal, having a frequency substantially equal to or less than the cut-off frequency of low pass filter 44, in the output signal from mixer 26 is passed through low pass filter 44 to the output of multiplexer 46.

Figure 6A:
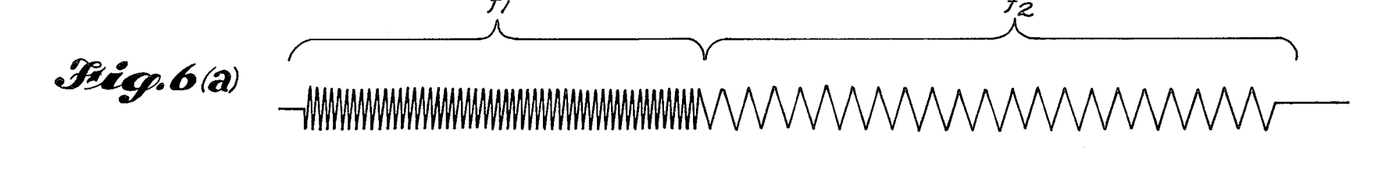
Figure 6B:
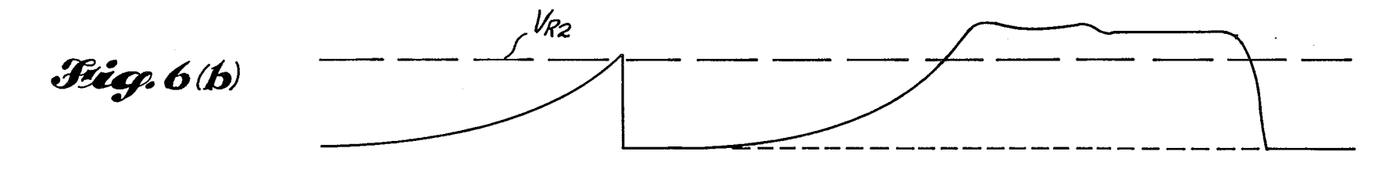
Figure 6C:
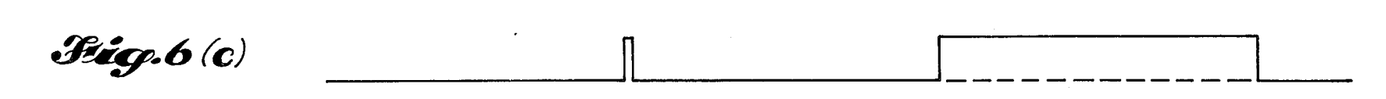
Figure 6D:
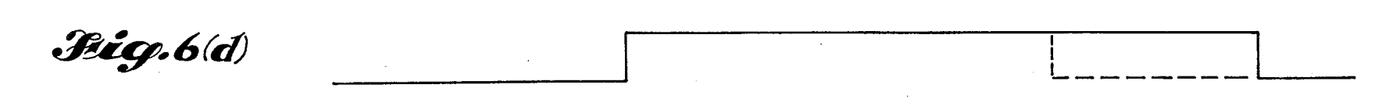
Figure 6E:
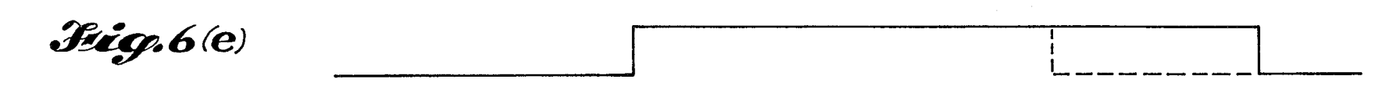
Figure 6F:
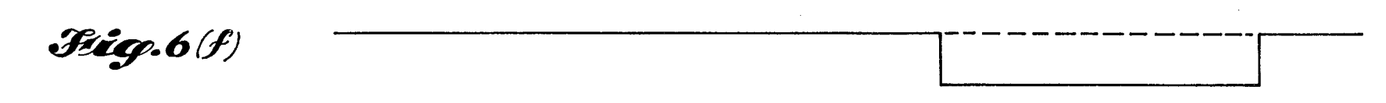
Figure 6G:
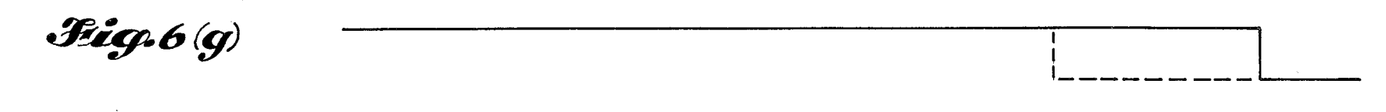

Each of the filters 38, 40, 42 and 44 has an identical cut-off frequency $f_{lp}$ which is equal to $\frac{1}{2}$ of the desired passband $f_b$ of the decoder 14. In the logging industry application, $f_b = 20$ Hz so that $f_{lp} = 10$ Hz. Accordingly, the signal at the output of multiplexer 46 alternates, at the multiplex frequency $f_m$, between values related to $\sin |f_i - f_r|$, or, $\sin f_x$, and values related to $\cos |f_i - f_r|$, or, $\cos f_x$, provided that $f_x$ is equal to or less than the cut-off frequency $f_{lp}$. Let it be assumed that the frequency difference $(f_i - f_r)$ of the tone signal is within the passband $f_b$, so that the signal on the output of multiplexer 46 alternately represents $\sin f_x$ and $\cos f_x$. The output from multiplexer 46 is applied to the input of a squarer 48, which may comprise an analog multiplier such as the type MC1594L integrated circuit chip available from Motorola. The output signal from squarer 48 therefore is alternately related to $\sin^2 f_x$ and $\cos^2 f_x$, which are separated in time from each other by the multiplex period established by the multiplex frequency $f_m$. The signal on the output of a squarer 48 is applied to the input of an integrating amplifier 50, whose integration period is related to the multiplex period. As a result, the integrating amplifier 50 removes the multiplex frequency $f_m$, and sums the $\sin^2 f_x$ and $\cos^2 f_x$ components of the output signal from squarer 48. Since the $\sin^2 f_x$ and $\cos^2 f_x$ components are 180° out of phase, the output signal from integrating amplifier 50 is a dc voltage whose level increases with respect to time, as illustrated in FIG. 6(b).

The dc voltage on the output of integrating amplifier 50 is provided to the input of an automatic level control circuit 52 to which is also supplied a threshold voltage $V_{T1}$ from a threshold voltage source 54. Automatic level control circuit 52 is operative to provide the dc, automatic level signal on its output whose value is such, when subtractively combined with the tone signal at summing junction 24, that any output signal from integrating amplifier 50 achieves the voltage level established by the threshold voltage $V_{T1}$ within a first predetermined period of time following the first production of an output signal from squarer 48. In other words, the output signal from squarer 48 may be characterized as $$a|\sin^2 f_x| + a|\cos^2 f_x|$$

and the output signal from integrating amplifier 50, after the passage of a first predetermined period of time, may be accordingly characterized as $a$, where $a = V_{T1}$.

The output signal from integrating amplifier 50 is applied to the input of a comparator 56 to which is also supplied a threshold voltage $V_{T2}$ from a threshold voltage source 58. The value of threshold voltage $V_{T2}$ is chosen to be slightly less than that of $V_{T1}$, so that $V_{T2} < a.$ When the output signal from integrating amplifier 50 exceeds $V_{T2}$, comparator 56 provides an output signal to a tone switching logic circuit 60 which is the source of the tone control signal previously described. Normally, tone switching logic circuit 60 is operative to provide a tone control signal having a low logic level, signifying a desired detection of a tone signal at or near the frequency $f_1$. As a result, the reference signal has a frequency $f_r \approx f_1$, and the demultiplexer 36 and multiplexer 46 are controlled, as previously described, to alternately place the filters 38, 40 in the signal path between mixer 26 and squarer 48 to enable the decoder 14 to detect a tone signal at or near the frequency $f_1$. Upon the first production of an output signal from comparator 56, the tone control signal provided by tone switching logic circuit 60 switches to a high logic level, thereby changing the divisor N in counter 30 to a value which will result in the production of a reference signal having a frequency $f_r \approx f_2$. In addition, the demultiplexer 36 and multiplexer 46 are controlled, as previously described, to alternately place the filters 42, 44 in the signal path between mixer 26 and squarer 48, thereby enabling the decoder 14 to detect a tone signal at or near the frequency $f_2$. When the tone control signal goes to a high logic level, any signal applied to squarer 48 from multiplexer 46 is immediately removed, thereby resetting comparator 56. If comparator 56 does not subsequently provide a second output signal within a second predetermined period of time, as established within tone switching logic circuit 60, then the tone control signal is returned to its low logic level and the decoder 14 is again enabled to detect a tone signal at or near the frequency $f_1$. If a second output signal from comparator 56 is provided within this second predetermined period of time, then tone switching logic circuit 60 provides an output signal which is coupled through an output buffer 62 to actuate the utilization device 16, and maintains such output signal for the duration of the second output signal from comparator 56. In the logging industry application, the first predetermined period of time required for the detection of any tone signal is in the range of 30-50 ms, and the second predetermined period of time in which a tone signal at or near the frequency $f_2$ must be detected is approximately 60 ms.

Referring now to FIGS. 5 and 6(a)-6(g), the tone switching logic circuit 60 includes an inverter 120, a J-K flip-flop 122, an inverter 124, a J-K flip-flop 126, a NAND gate 128, a capacitor $C_1$, a resistor $R_1$, a diode $D_1$, and a NOR gate 130. The output signal from comparator 56 is applied through inverter 120 to a clock (C) input of flip-flop 122 and is applied directly to a first input of NAND gate 128. The output of inverter 120 is also coupled through inverter 124 to a clock (C) input of flip-flop 126. Ground potential is applied to the K input of flip-flop 122, 126. A source of a supply potential $V_{cc}$ is applied to the J input to flip-flop 122 and the output of flip-flop 122 is connected to the J input of flip-flop 126 so as to allow flip-flop 126 to be placed into its J-state only when flip-flop 122 is in its J-state. The signal on the output of flip-flop 122 comprises the tone control signal, and is coupled to the divide-by-N counter 30, the demultiplexer 36, and the multiplexer 46, as previously described.

Figure 5:
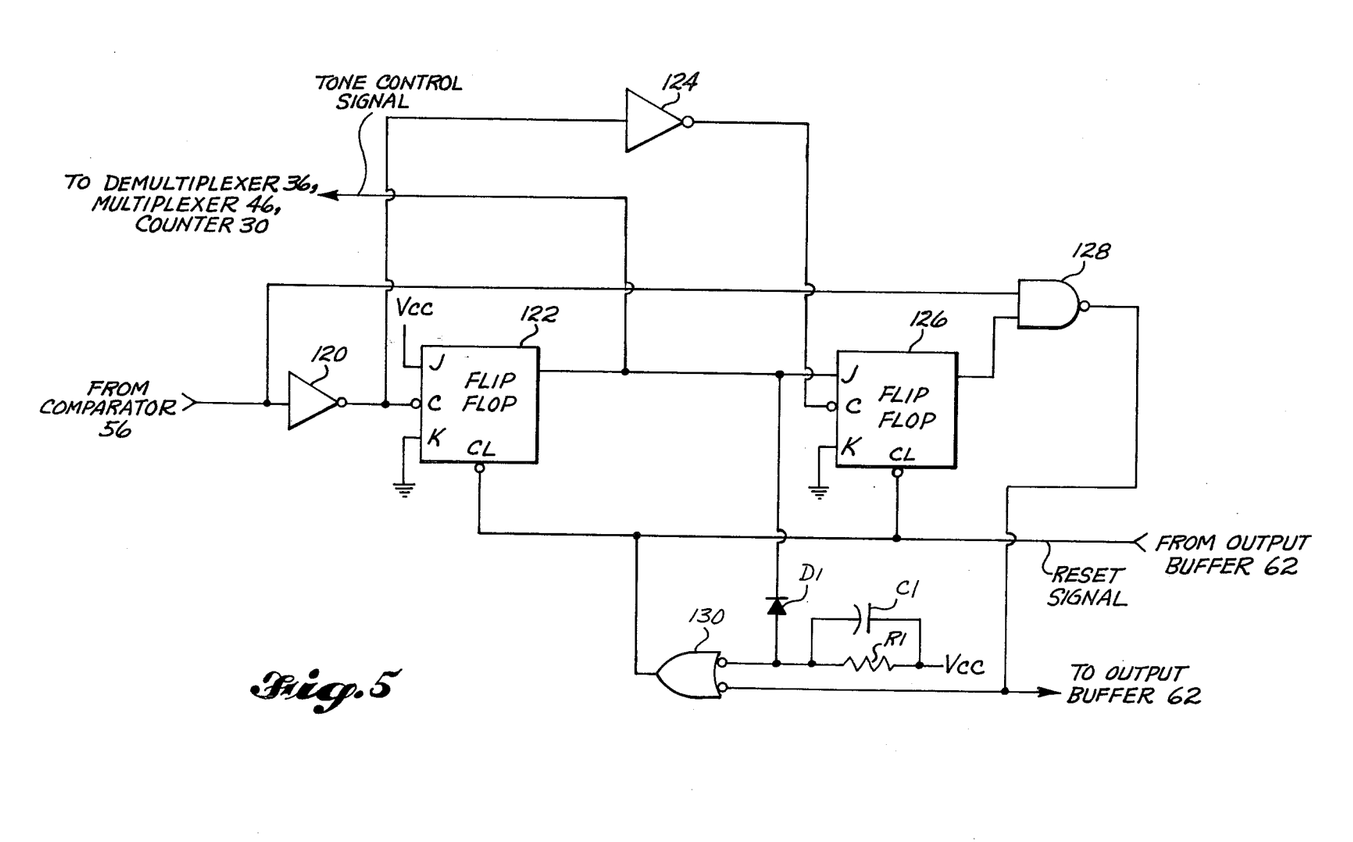
FIG. 5 is a block diagram of a preferred embodiment of a tone switching logic circuit forming part of the decoder of FIG. 2.

The output of flip-flop 126 is connected to a second input of NAND gate 128, whose output is coupled to the output buffer 62 and to a first input of NOR gate 130. The signal on the output of NAND gate 128 comprises the output signal from tone switching logic circuit 60. The supply potential $V_{cc}$ is coupled to a second input of NOR gate 130 by a parallel-connection of capacitor $C_1$ and resistor $R_1$, and diode $D_1$ couples the second input of NOR gate 130 to the output of flip-flop 122. The output of NOR gate 130 is connected in common to clear (CL) inputs of flip-flops 122, 126, as is a RESET signal from output buffer 62.

Assuming that no tone signals have been applied to the decoder 14, the output signal from comparator 56 (FIG. 6(c)) is at a low logic level. At the termination of a previous detection by the decoder 14, the output buffer 62 will have provided a momentary RESET signal, having a low logic level, to the clear inputs of flip-flops 122, 126 to clear flip-flops 122, 126 to their K-states wherein the signals on the outputs thereof (FIGS. 6(d), 6(e), respectively) are at a low logic level. Accordingly, diode $D_1$ is forward biased so that a low logic level signal will have been applied to the first input of NOR gate 130. Since the output signal from comparator 56 is at a low logic level, the output signal from NAND gate 128 (FIG. 6(f)) is at a high logic level, and maintains the output signal from NOR gate 130 (FIG. 6(g)) at a high logic level.

Upon detection of a tone signal at or near the frequency $f_1$, as illustrated in FIG. 6(b), the output signal from comparator 56 switches to a high logic level, thereby clocking flip-flop 122 to its J-state, whereupon the output signal therefrom goes to a high logic level. The resultant tone control signal causes the reference signal to switch to the desired frequency $f_2$ and also causes multiplexer 46 to immediately remove the input signal from squarer 48 so that the output signal from comparator 56 very quickly returns to a low logic level. As the output signal from comparator 56 returns to a low logic level, flip-flop 126 is clocked to its J-state, whereupon the output signal therefrom goes to a high logic level. However, the output signal from NAND gate 128 remains at a high logic level.

When flip-flop 122 is clocked to its J-state, diode $D_1$ is reverse-biased. However, the signal presented to the first input of NOR gate 130 remains at a low logic level for a predetermined period of time established by the time constant of capacitor $C_1$ and resistor $R_1$. Accordingly, the output signal from NOR gate 130 remains at a high logic level, thereby inhibiting the clearing of the flip-flops 122, 126 to their K-states. If the output signal from comparator 56 again switches to a high logic level, signifying detection of a tone signal at or near the frequency $f_2$, before capacitor $C_1$ has discharged to a point where the first input of NOR gate 130 is at a high logic level, then the concurrence of a high level logic signal from comparator 56, and a high level logic signal on the output of flip-flop 126, causes NAND gate 128 to provide a low level logic signal which, through buffer 62, actuates the uilization device 16. The low logic level signal on the output of NAND gate 128 persists for the duation of the second high level logic level signal from comparator 56 whereby the utilization device 16 is continuously actuated for the duration of the tone signal at or near the frequency $f_2$.

Upon termination of this tone signal, the output signal from comparator 56 again switches to a low logic level, so that the output signal from NAND gate 128 goes to a high logic level, thereby terminating the output signal to buffer 62 and terminating actuation of utilization device 16, and causing the output buffer 62 to provide the momentary RESET signal 62 to clear flip-flops 122, 126 to their K-states to condition the decoder 14 for the detection of subsequent tone signals.

As indicated by the dashed lines in FIGS. 6(b)-6(g), the absence of detection of a tone signal at or near the frequency $f_2$ for a period of time greater than that established by capacitor C1 and resistor R1 causes the output signal from NOR gate 130 to go to a low logic level toclear flip-flops 122, 126 to their K-states and to accordingly maintain the output signal from NAND gate 128 at a high logic level.

It will therefore be appreciated that tone signals having frequencies that are not within the passband $f_b$, established by the cut-off frequency $f_{1p}$ and the reference frequency $f_r$, will not result in the provision of an output signal to squarer 48, and the production of an output signal by comparator 56. Also, detection of a tone signal at or near the frequency $f_1$, but failure of detection of a subsequent signal at or near the frequency $f_2$ within the time period established by tone switching logic circuit 60, will not result in the production of an output signal by tone switching logic circuit 60.

If the frequency $f_i$ of the tone signal is identically equal to the reference frequency $f_r$, so that $f_x=0$, the output signals from filters 38 and 42, which are related to sin $f_x$, will be zero. However, the output signal from filters 40 and 44, which are related to cos $f_x$, will at a constant value which will provide actuation of comparator 56.

In most practical applications, the frequency $f_i$ will not be identically equal to the frequency $f_r$, due to frequency variations in the tone signal as encoded and in the frequency $f_r$, and also due to the fact that the frequency $f_r$ cannot easily be made exactly equal to a desired detection frequency inasmuch as the frequency $f_r$ is produced by counting down a fixed frequency produced by the oscillator 28. By simply changing the disvisor N in the divide-by-N counter 30, the nominal frequency to which the decoder is responsive can be easily changed. The stability of the nominal frequency and also the stability of the passband of the decoder, is determined by the stability of the oscillator 28, which may be very high and which is typically better than ±0.01% over a wide temperature range. The band width, or passband, of the decoder may be sharply defined by appropriate design of the low pass filters 38, 40, 42 and 44. Finally, it is not necessary in every multiple tone application that separate low pass filters be provided for each frequency to be detected, particularly in those situations in which multiple tone signals are separated in time from each other by a time period sufficient to allow the components of the low pass filters to discharge after detection to a level that would not affect the detection of a subsequent tone signal.

While the invention has been described with respect to a preferred embodiment, it is to be clearly understood by those skilled in the art that the invention is not limited thereto. Rather, the scope of the present invention is to be interpreted only in conjunction with the appended claims.

The embodiments of the invention in which an exclusive property or privilege is claimed are defined as follows:

1. An improved decoding apparatus for detecting whether the frequency $f_i$ of a tone signal is within a passband $f_b$ surrounding a desired detection frequency $f_d$, said apparatus comprising:
   means for providing a reference signal which alternates, at a frequency $f_m$, between values related to sin $f_r$ and cos $f_r$, where $f_r$ is substantially equal to $f_d$ and where $f_m$ is substantially greater than $f_r$;
   means for mixing the tone signal with said reference signal to provide a first output signal;
   means responsive to said first output signal for providing a second output signal which alternates, at said frequency $f_m$, between values related to sin $f_x$ and cos $f_x$, where $f_x=|f_i-f_r|$, provided that $f_x$ is substantially equal to or less than $f_b/2$;
   means responsive to said second output signal for providing a third output signal which alternates, at said frequency $f_m$, between values related to $\sin^2 f_x$ and $\cos^2 f_x$;
   means responsive to said third output signal for summing said values thereof related to $\sin^2 f_x$ and $\cos^2 f_x$ to provide a dc signal; and
   means responsive to said dc signal for providing a detection indication when the value of said dc signal exceeds a predetermined value.

2. The improved apparatus as recited in claim 1, wherein said means for providing a reference signal includes: a source of pulses occurring at said frequency $f_m$; and, a sine/cosine generator means responsive to said pulses occurring at said frequency $f_m$ for providing said reference signal.

3. The improved apparatus as recited in claim 2, wherein said source of pulses includes: an osillcator for providing a series of high frequency pulses; and, a counter means which is operative to divide said high frequency pulses by a divisor N to produce said pulses occurring at said frequency $f_m$.

4. The improved apparatus as recited in claim 3, wherein said sine/cosine generator means includes means operative to divide said pulses occurring at said frequency $f_m$ to provide said reference signal, so that said frequency $f_m$ is an integral multiple of said frequency $f_r$.

5. The improved apparatus as recited in claim 4, wherein the divisor N is selectively variable to accordingly vary said frequency $f_r$ and therefore said desired detection frequency $f_d$.

6. The improved apparatus as recited in claim 2, wherein said means responsive to said first output signal includes:
   first and second, low pass filters, each of which has an input, an output, and a cut-off frequency $f_{1p}$, where $f_{1p}=f_b/2$; and,
   multiplexing means responsive to said pulses occurring at said frequency $f_m$ for alternately applying, at said frequency $f_m$, said first output signal to said inputs of said first and second low pass filters, respectively, and for providing said second output signal by alternately coupling, at said frequency $f_m$, said outputs of said first and second low pass filters to said means responsive to said second output signal.

7. The improved apparatus as recited in claim 1, wherein said means responsive to said first output signal includes:

first and second, low pass filters, each of which has an input, an output, and a cut-off frequency $f_{1p}$, where $f_{1p} = f_b/2$; and multiplexing means for alternately applying, at said frequency $f_m$, said first output signal to said inputs of said first and said second low pass filters, respectively, and for providing said second output signal by alternately coupling, at said frequency $f_m$, said outputs of said first and said second low pass filters to said means responsive to said second output signal.

8. The improved apparatus as recited in claim 1, wherein said means responsive to said third output signal includes an integrating amplifier whose integration period is related to said frequency $f_m$.

9. The improved apparatus as recited in claim 1, wherein said means responsive to said dc signal includes: a source of a threshold signal whose value is related to said predetermined value; and, a comparator which is responsive to said threshold signal and to said dc signal for providing a circuit output signal when the value of said dc signal exceeds said predetermined value.

10. A method for detecting whether the frequency $f_i$ of a tone signal is within a passband $f_b$ surrounding a desired detection frequency $f_d$, said method comprising the steps of:

(a) providing a mixed signal by mixing the tone signal with a reference signal alternating at a frequency $f_m$ between values related to sin $f_r$ and cos $f_r$, where $f_r$ is a frequency substantially equal to $f_d$ and where $f_m$ is substantially greater than $f_r$;

(b) in synchronism with said frequency $f_m$, filtering from said mixed signal any components thereof that are related to sin $f_x$ and cos $f_x$, where $f_x = |f_i - f_r|$, provided that $f_x$ is substantially equal to or less than $f_b/2$, to provide a filtered signal alternating at said frequency $f_m$ between values related to sin $f_x$ and cos $f_x$;

(c) squaring said filtered signal to provide a squared signal alternating at said frequency $f_m$ between values related to $\sin^2 f_x$ and $\cos^2 f_x$;

(d) integrating said squared signal over a period related to said frequency $f_m$ to provide a dc signal; and (e) providing an indication of tone detection when the value of said dc signal equals or exceeds a predetermined value thereof.

11. A method as recited in claim 10, which is particularly adapted to detect whether the frequency of the tone signal is sequentially within said passband $f_b$ of first and second, different detection frequencies $f_1$, $f_2$, said method further comprising the steps of:

(a) normally maintaining said frequency $f_r$ at a value substantially equal to said first detection frequency $f_1$;

(b) upon an initial indication of tone detection, changing said frequency $f_r$ to a value substantially equal to said second detection frequency $f_2$; and (c) providing an indication of sequential tone detection only if a second indication of tone detection is provided within a predetermined period of time following said initial indication thereof.

12. A method as recited in claim 10, wherein said frequency $f_m$ is an integral multiple of said frequency $f_r$.

13. A method as recited in claim 10, wherein said frequency $f_r$ is within the audible frequency range.

14. An improved decoder for providing a decoder output signal when a tone signal contains frequencies that are sequentially within a predetermined passband surrounding first and second detection frequencies $f_1$, $f_2$, said decoder comprising:

(a) means for providing a reference signal which alternates, at a multiplex frequency, between sine and cosine signals, each of said sine and cosine signals being at a predetermined reference frequency which is less than said multiplex frequency, said means being responsive to respective first and second values of a tone control signal for maintaining said reference frequency at values respectively, substantially equal to said first and said second detection frequencies $f_1$, $f_2$;

(b) a source of a multiplex control signal at said multiplex frequency;

(c) a mixer for mixing the tone signal with said reference signal to provide a mixer output signal;

(d) first, second, third and fourth low pass filters, each of said filters having an input, an output, and a cut-off frequency which is one-half of said passband;

(e) a demultiplexer responsive to said multiplex control signal and to said tone control signal for alternately coupling, at said multiplex frequency, said mixer output signal to the inputs of said first and said second low pass filters when said tone control signal has said first value, and for alternately coupling, at said multiplex frequency, said mixer output signal to the inputs of said third and said fourth low pass filters when said tone control signal has said second value;

(f) a squarer circuit having an input and an output;

(g) a multiplexer responsive to said multiplex control signal and to said tone control signal for alternately coupling, at said multiplex frequency, the outputs of said first and said second low pass filters to the input of said squarer circuit when said tone control signal has said first value, and for alternately coupling, at said multiplex frequency, said outputs of said third and said fourth low pass filters to the input of said squarer circuit when said tone control signal has said second value;

(h) an integrating amplifier, having an integration period related to said multiplex frequency, for providing a dc signal in response to signals present on the output of said squarer circuit;

(i) a source of a threshold voltage;

(j) a comparator for providing a comparator output signal when the voltage of said dc signal exceeds that of said threshold voltage;

(k) a tone switching logic circuit for providing said tone control signal, said tone switching logic circuit normally maintaining said tone control signal at said first value, and being operative to switch said tone control signal to said second value in response to a first comparator output signal, and being further operative to provide said decoder output signal only if a second comparator output signal is provided within a predetermined period of time following the provision of said first comparator output signal.

15. An improved decoder as recited in claim 14, further comprising means for coupling said source of a multiplex control signal to said means for providing a reference signal, so that said multiplex frequency is an integral multiple of said reference frequency.

16. An improved decoder as recited in claim 14, further comprising means controlling the amplitude of the tone signal so as to maintain the voltage of said dc signal at a value equal to or greater than that of said threshold voltage.

17. An improved decoder as recited in claim 14, wherein said reference frequency is in the audible frequency range.

18. An improved decoder as recited in claim 17, wherein said reference frequency is in the range of 250 Hz to 6 kHz.

19. An improved decoder as recited in claim 14, wherein said passband is substantially 20 Hz.

20. An improved decoder as recited in claim 14, wherein said predetermined period of time is substantially 60 milliseconds.

* * * * *